(12) United States Patent
Fujiwara

(10) Patent No.: US 7,116,448 B1
(45) Date of Patent: Oct. 3, 2006

(54) IMAGE FORMING APPARATUS, IMAGE FORMING SYSTEM, PRINTER CONTROLLER, AND COMPUTER-READABLE RECORD MEDIUM

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/400,222

(22) Filed: Sep. 21, 1999

(30) Foreign Application Priority Data

Sep. 21, 1998 (JP) ................................. 10-266756

(51) Int. Cl.
*H04N 1/405* (2006.01)
(52) U.S. Cl. ....................................... 358/3.2; 358/515
(58) Field of Classification Search ................ 358/1.9, 358/3.06–3.09, 3.13–3.2, 515–523; 382/237
See application file for complete search history.

(56) References Cited

U.S. PATENT DOCUMENTS

| | | | | |
|---|---|---|---|---|
| 4,196,451 A | * | 4/1980 | Pellar | 358/534 |
| 4,916,545 A | * | 4/1990 | Granger | 358/3.26 |
| 5,231,677 A | | 7/1993 | Mita et al. | |
| 5,463,720 A | * | 10/1995 | Granger | 358/1.9 |
| 5,745,249 A | * | 4/1998 | Crean et al. | 358/3.06 |
| 5,805,305 A | | 9/1998 | Abe | 358/457 |
| 5,821,915 A | * | 10/1998 | Graham et al. | 345/615 |
| 6,133,927 A | * | 10/2000 | Arai et al. | 347/131 |

FOREIGN PATENT DOCUMENTS

| | | |
|---|---|---|
| JP | 6-178133 | 6/1994 |
| JP | 8-23444 | 1/1996 |
| JP | 09-294208 | 11/1997 |

OTHER PUBLICATIONS

Notice of Reason for Rejection directed to counterpart Japanese Patent Application 10-266,756 mailed Sep. 13, 2005.

* cited by examiner

*Primary Examiner*—Thomas Lee
*Assistant Examiner*—Stephen Brinich
(74) *Attorney, Agent, or Firm*—Morrison & Foerster LLP

(57) ABSTRACT

An image forming system for suppressing the generation of moiré effect of a print image, provided with a receiving apparatus for receiving an image data of a document, a printer controller for detecting a screen angle of a document image based on the image data, selecting from a plurality of dither patterns a dither pattern with a screen angle different from the detected screen angle and setting the dither pattern, and a printer for reproducing a quasi-halftone using the dither pattern set up by the printer controller.

24 Claims, 9 Drawing Sheets

DOCUMENT IMAGE WITH A SCREEN ANGLE OF 45°

DOCUMENT IMAGE WITH A SCREEN ANGLE OF 75°

FIG. 6A     FIG. 6B     FIG. 6C
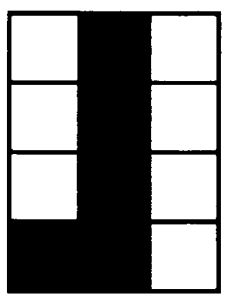 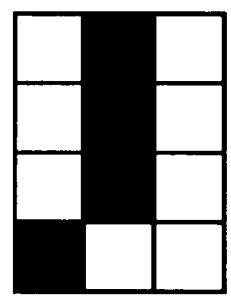 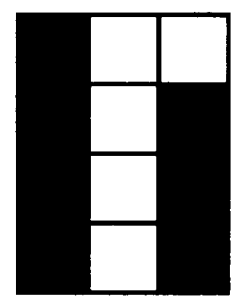
FIG. 6D     FIG. 6E     FIG. 6F
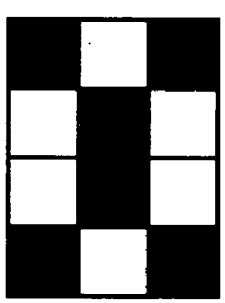 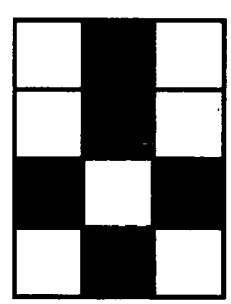 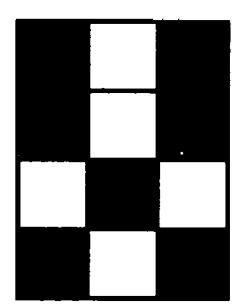

IMAGE FORMING APPARATUS, IMAGE FORMING SYSTEM, PRINTER CONTROLLER, AND COMPUTER-READABLE RECORD MEDIUM

This application is based on Japanese Patent Application No. 10-266756 filed on Sep. 21, 1998, the contents of which are hereby incorporated by reference.

BACKGROUND OF THE INVENTION

1. Field of the Invention

The present invention relates to an image forming apparatus used to express gradation by means of screen-processing an input image, in particular, to an image forming apparatus capable of suppressing the moiré effect.

2. Description of the Related Art

There is a case when an image with multiple gradations is applied to an output apparatus capable of handling a number of gradations less than the number of the gradations of the image itself. In a typical output apparatus of the prior art, the output is treated with a screen processing using a plurality of dither patterns so that a number of gradations higher than that of the gradation of each pixel can be obtained by treating a plurality of pixels as a unit.

In a case where a quasi-halftone is reproduced to output a dot matrix document using a dither pattern with a specific screen angle such as a dot dither, a problem of the moiré effect can occur depending on the relation between the screen angle of the document image and the screen angle of the dither pattern.

When the line number of the dots of the document image is close to that of the dither of the output apparatus, and also the screen angle of the document and that of the dither is almost the same, the moiré effect of a low frequency is likely to occur.

Generally speaking, the line number of the dots and the screen angle of the document are not constant. For example, the document has a specific screen angle for each color of cyan, magenta, and yellow. Therefore, the moiré effect can occur depending on a document when a quasi-halftone is reproduced using a specific dither pattern.

As a means of avoiding the moiré effect, it is conceivable to increase the line number of a dot matrix document to a degree that there is practically no problem. For implementing said idea, however, the output apparatus is required to have an output capability of a higher degree of resolution to secure gradation and a control capability sufficient for area modulation and intensity modulation below one dot level. In other words, the output apparatus must have an extremely high performance capability, which makes it impractical from the cost standpoint.

Japanese Patent Unexamined Publication, JP-A-08-23444 discloses a method of avoiding the moiré effect without recourse to the use of a high performance output apparatus. The method consists of (a) converting the image data before and after the screen processing into frequency planes respectively; (b) assuming that a moiré effect occurred when a low frequency peak appears that did not exist on the frequency plane of the image before the screen processing; and (c) selecting an optimum screen size. This method does not require a high performance output apparatus, so that it is relatively easy to market it.

In essence, said method is to detect the moiré effect based on the image after the screen processing, and to change the screen size if it is determined that the moiré effect has occurred. As a result, resolution lowers if the screen size is larger than the original size, and gradation deteriorates if the screen size is smaller.

Generally, the screen size of an output apparatus is set to a size that optimizes the balance between resolution and gradation considering performance of the output apparatus. Therefore, the output image quality will be adversely affected if either resolution or gradation is affected as a result of the screen size change intended to suppress the moiré generation.

SUMMARY OF THE INVENTION

It is a general object of the invention is to enable the gradation expression while suppressing the moiré generation.

Another object of the invention is to provide an image forming apparatus including a receiving means for receiving an image data of a document, a detecting means for detecting a screen angle of a document image based on the image data, a setup means for selecting from a plurality of dither patterns a dither pattern with a screen angle different from the detected screen angle and setting up the dither pattern, and a printing means for reproducing a quasi-halftone using the dither pattern set up by the setup means.

Another object of the invention is to provide an image reading apparatus having a reading means for reading an image data of a document, a detection means for detecting a screen angle of a document image based on the image data, and a setup means for selecting from a plurality of dither patterns a dither pattern with a screen angle different from the detected screen angle and setting up the dither pattern.

Another object of the invention is to provide a printer controller including a detection means for detecting a screen angle of a document image based on an image data of a document inputted, a setup means for selecting from a plurality of dither patterns a dither pattern with a screen angle different from the detected screen angle and setting the dither pattern, and a data generating means for generating a print data in order to reproduce a quasi-halftone using the dither pattern set up by the setup means.

Another object of the invention is to provide an image forming system having a receiving apparatus for receiving an image data of a document, a printer controller for detecting a screen angle of a document image based on the image data, selecting from a plurality of dither patterns a dither pattern with a screen angle different from the detected screen angle and setting the dither pattern, and a printer for reproducing a quasi-halftone using the dither pattern set up by the printer controller.

Another object of the invention is to provide a record medium for storing a program readable and executable by a computer. The program is composed of (A) receiving an image data of a document, (B) detecting a screen angle of a document image based on the image data, (C) selecting from a plurality of dither patterns a dither pattern with a screen angle different from the detected screen angle and setting the dither pattern, and (D) reproducing a quasi-halftone using the setup dither pattern.

The objects, characteristics, and advantages of this invention other than those set forth above will become apparent from the following detailed description of the preferred embodiments, which refers to the annexed drawings.

BRIEF DESCRIPTION OF THE DRAWINGS

FIGS. 6A through 6C are example detection patterns used for detecting a document image having a screen angle of 45 degrees, and FIGS. 6D through 6F are detection patterns used for detecting a document image having a screen angle of 75 degrees;

DETAILED DESCRIPTION OF THE EMBODIMENTS

The embodiments of this invention will be described below with reference to the accompanying drawings.

Embodiment 1

Figure 1:
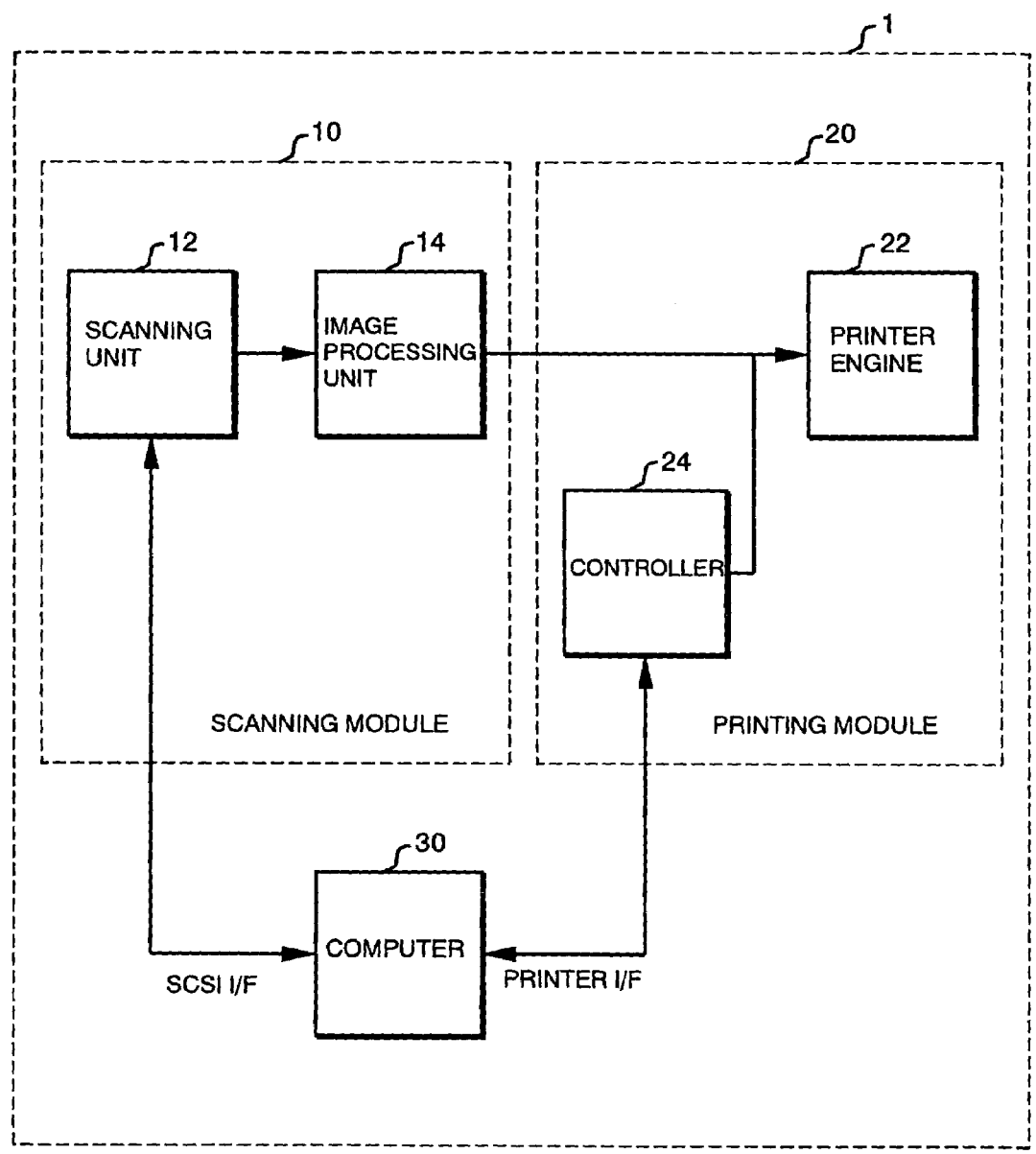
FIG. 1 is a block diagram of an image forming apparatus of a first embodiment of the present invention.

The image forming apparatus shown in FIG. 1 consists of a scanning module 10, a printing module 20, and a computer 30. The image forming apparatus 1 detects a document image screen angle, selects a dither pattern corresponding to the detected screen angle from a plurality of dither patterns with different screen angles, and sets up the dither pattern to avoid the moiré effect occurrence on printed images. A dot dither is an example of the dither patterns having a specific screen angle.

The scanning module 10 has a scanning unit 12 and an image processing unit 14. The scanning unit 12 is equipped with a CCD (charged couple device) for detecting image data of three colors, i.e., R (red), G (green) and B (blue). The CCD scans a document and outputs RGB image data consisting of 8 bits for each color. The image processing unit 14 converts the RGB image data inputted from the scanning unit 12 into CMYK image data consisting of data for four colors, i.e., C (cyan), M (magenta), Y (yellow) and K (black).

The printing module 20 has a printer engine 22 and a controller 24. The printer engine 22 executes color printing based on the CMYK image data outputted from the image processing unit 14. The controller 24 calculates data related to printing, which is received from the computer 30, and outputs the result to the printer engine 22 and the computer 30.

The computer 30 is a general-purpose computer such as a personal computer, and is connected to the scanning unit 12 via SCSI interface and to the controller 24 via a printer interface. When the computer 30 outputs a signal for executing a scan, the scanning unit 12 reads the image of a document by executing the scan, and the printer engine 22 executes color printing based on the printing input data from the computer 30 via the controller 24.

The scanning module 10 and the printing module 20 are constituted in such a way that they can output image data to the computer 30 or receive image data from the computer 30 independent of each other.

Figure 2:
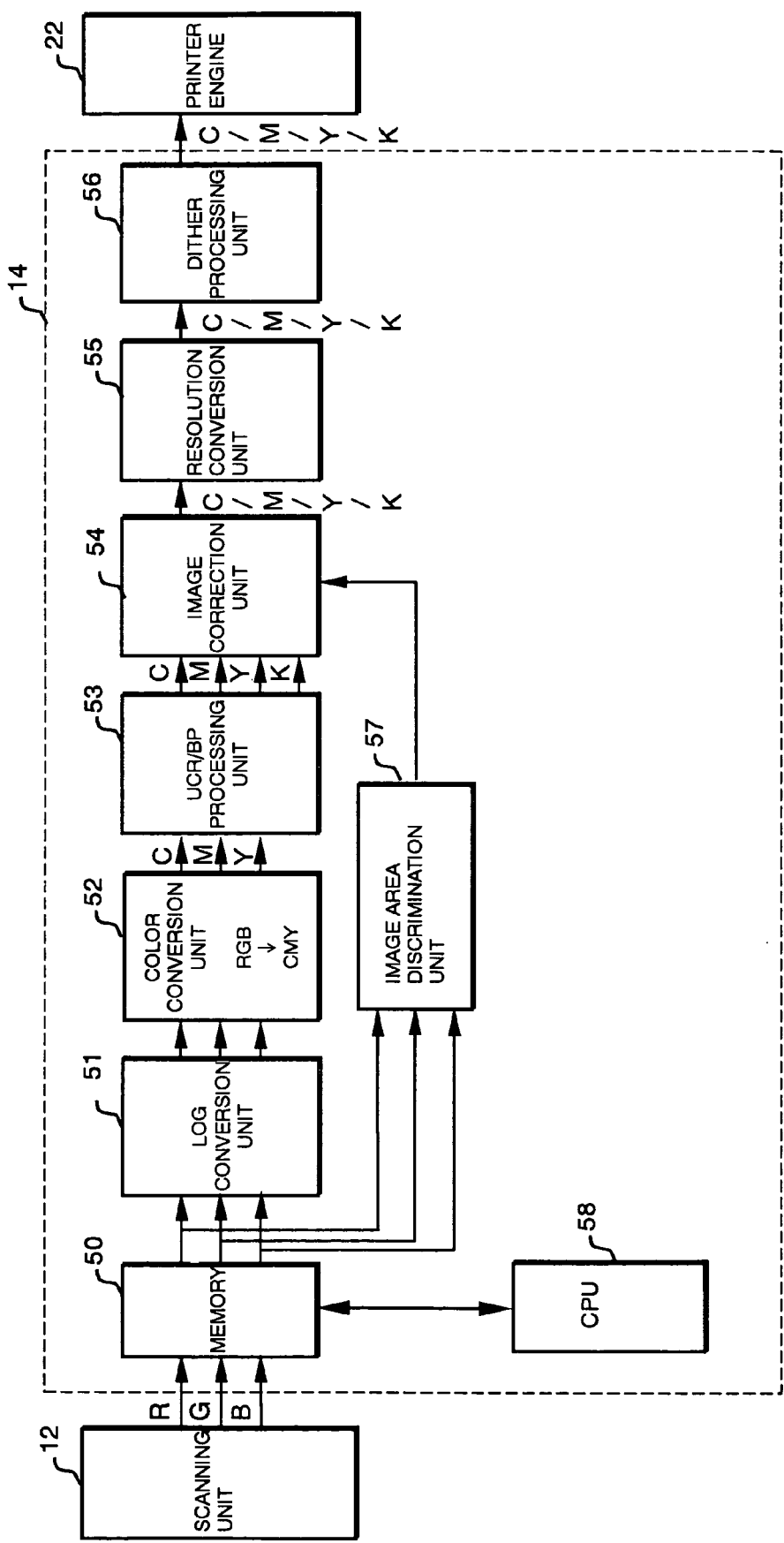
FIG. 2 is a block diagram of an image processing unit 5 shown in FIG. 1.

Now, the detail structure of the image processing unit 14 shown in FIG. 1 is described referring to FIG. 2.

Memory 50 of the image processing unit 14 stores the 8 bit RGB image data outputted from the scanning unit 12 by each color. LOG conversion unit 51 converts image data consisting of reflection factors read from the memory 50 by each color into image data consisting of density data. Color conversion unit 52 converts the RGB image data consisting of density data inputted from the LOG conversion unit 51 into CMY image data. UCR/BP processing unit 53 converts the CMY image data inputted from the color conversion unit 52 into CMYK image data which determine printing colors.

Image correction unit 54 applies MTF correction, filtering process for smoothing, and γ correction to match with the output properties of the printer engine 22 to each color of the CMYK image data inputted from the UCR/BP processing unit 53. The content of the γ correction varies with the screen angle of the dither pattern. The content of the filtering process also varies with the result of discrimination whether the image area is a character area or a picture area provided by an image area discrimination unit 57.

The resolution conversion unit 55 converts the image inputted from the image correction unit 54 into a data with a higher degree of resolution. More specifically, the resolution conversion unit 55 converts the reading resolution of the scanning unit 12, 300 dpi by 300 dpi, into the resolution, 1200 dpi in the main scanning direction by 600 dpi in the secondary scanning direction as the minimum units of a dither table.

The dither processing unit 56 converts the multi-valued image data inputted from the resolution conversion unit 55 into binary data, compares the screen angle of the converted image data with the screen angles of the dither patterns, and sets up the desired dither pattern to be used. The dither patterns have a specific screen angle to reproduce quasi-halftone without causing the moiré effect, and are set on the dither tables, or first and second dither tables stored in a ROM of the dither processing unit 56.

The printer engine 22 prints a color image based on image data inputted from the dither processing unit 56. The image area discrimination unit 57 divides 8 bit RGB image data taken out from the memory 50 into a plurality of areas, discriminates whether each area is a character area or a picture area, and outputs the discrimination result to the image correction unit 54.

CPU 58 controls the actions of all the parts constituting the image processing unit 14, and operates four times to cause each part to act corresponding to each color, C, M, Y and K in order to output a sheet of color print paper.

Figure 3:
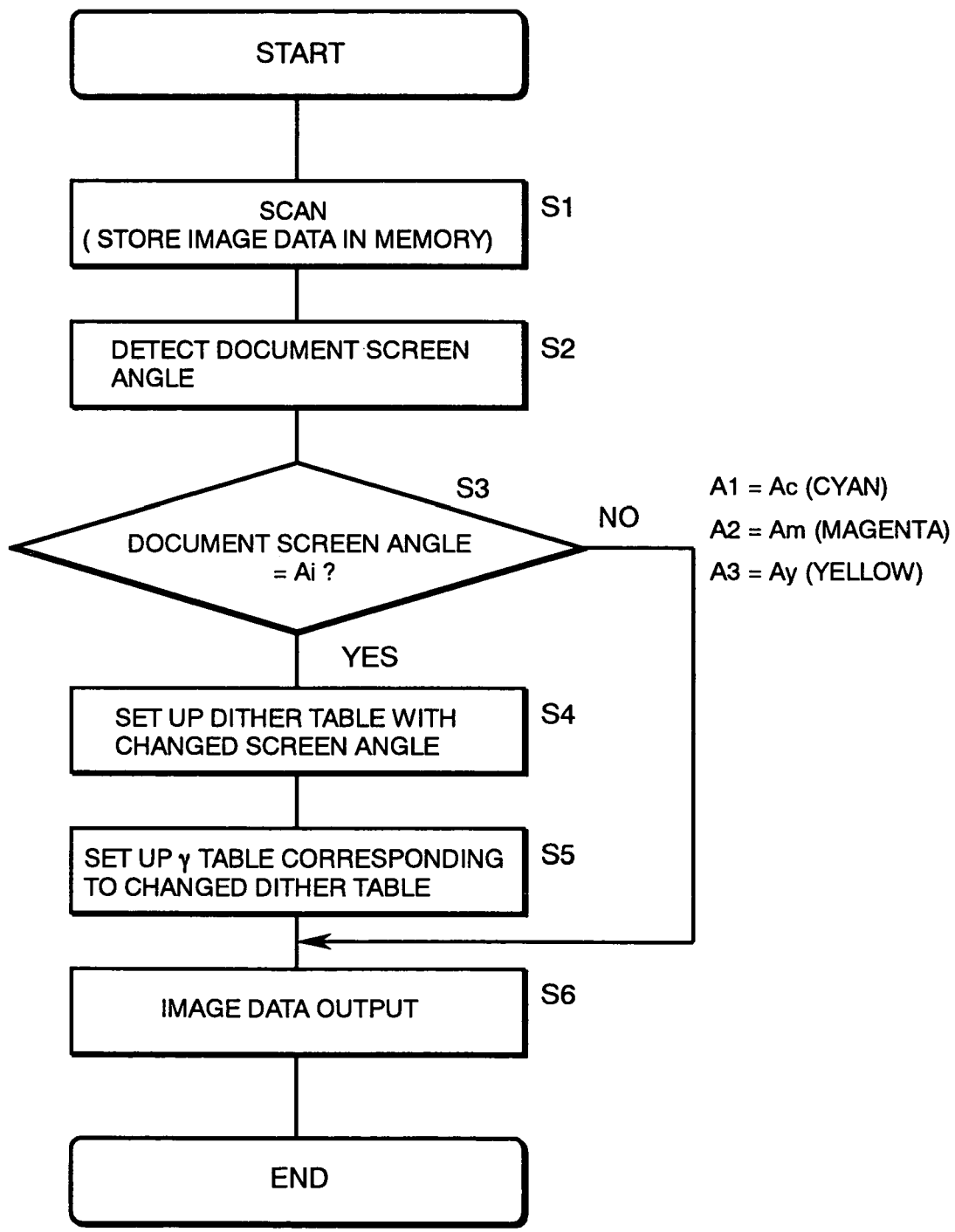
FIG. 3 is a flow chart for detecting a document image screen angle, setting up a dither pattern, and outputting an image.
Figure 4:
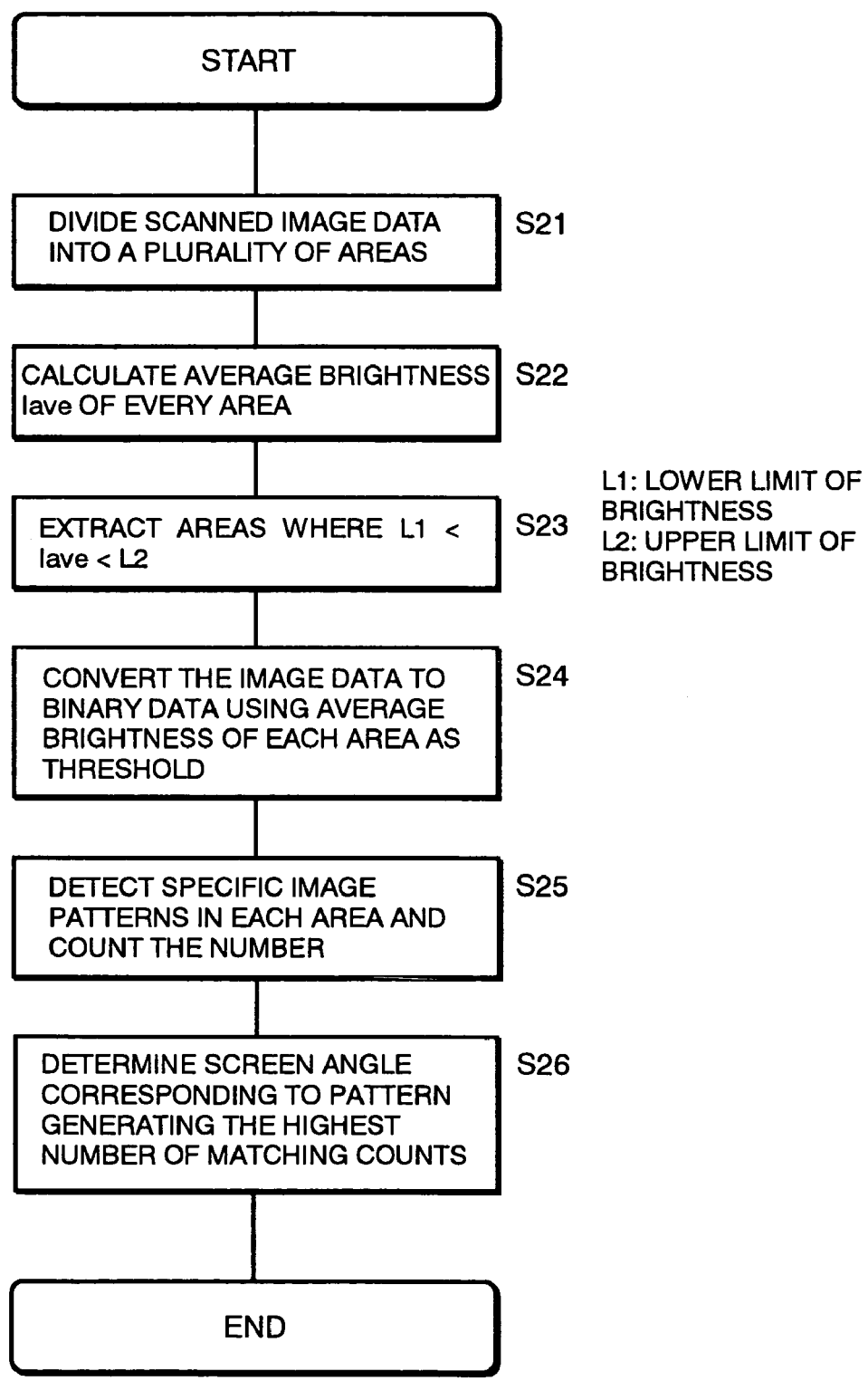
FIG. 4 is a flow chart of a subroutine for detecting a document image screen angle.

Now, the process of detecting the screen angle of a document image, and setting a dither pattern that prevents the moiré effect occurrence is described referring to FIG. 3 and FIG. 4.

First, the document is scanned by the scanning unit 12 to be read as 8 bit RGB image data, and the image data for each color is stored in the memory 50 (step S1). The image area discrimination unit 57 then reads the image data stored in the memory 50 and detects the screen angle of the document image concerning the image data for one color, e.g., red (step s2).

Now, the detection of the screen angle of the step S2 is described in detail referring to FIG. 4.

First, the image area discrimination unit 57 divides the image data thus read out into a plurality of areas (step S21), and calculates the average brightness $I_{ave}$ of every area (step S22). When the calculation of the average value of the brightness of every area is completed, the areas whose average brightness value $I_{ave}$ fall within a range between a predetermined lower limit L1 and a predetermined upper limit L2 are extracted (step S23). The reason for searching the areas whose brightness fall within a certain range is that it is necessary to eliminate the areas with a high brightness or a low brightness which are inappropriate for detecting the screen angle of the document image.

Figure 5A:
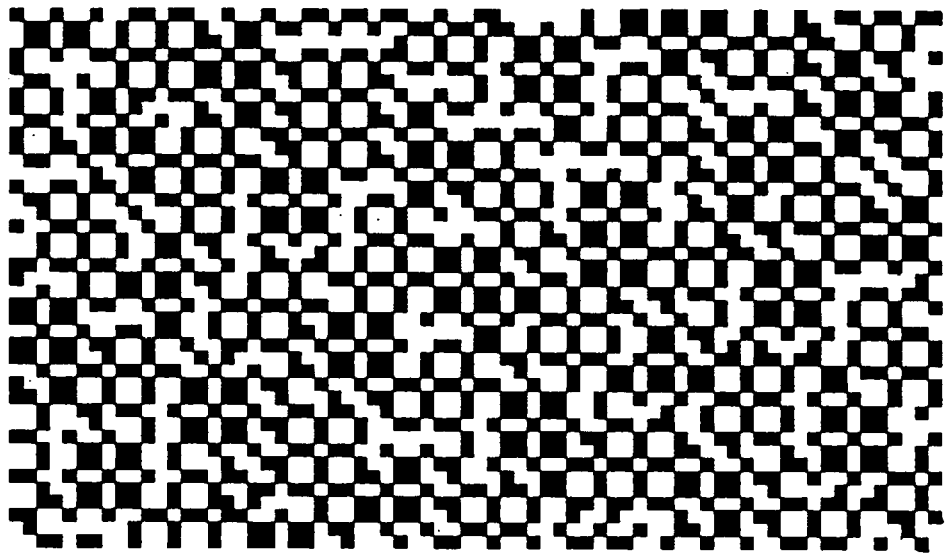
FIG. 5A is an example image after binary digitization when a document image screen angle is 45 degrees.
Figure 5B:
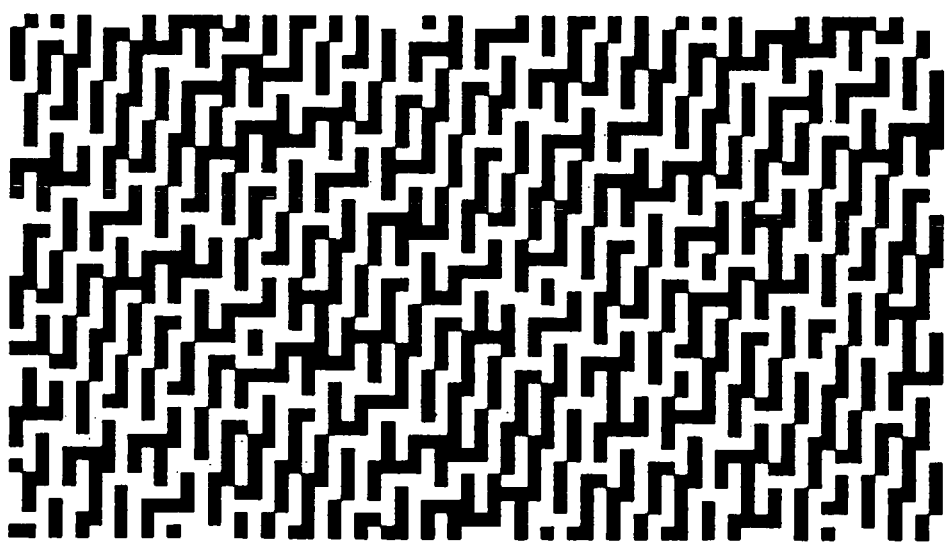
FIG. 5B is an example image when a document image screen angle is 75 degrees.

The average brightness of the areas thus extracted is then used as a threshold value to convert the image data to binary data (step S24). Examples of the image data after converting the image data to binary data are shown in FIG. 5A and FIG. 5B. The document image of FIG. 5A as a dot matrix image has the screen angle of 45 degrees and the line number of 133 lines per inch. The document image of FIG. 5B as a dot matrix image has the screen angle of 75 degrees and the line number of 133 lines per inch. These screen angles correspond to the two screen angles of the dither patterns prepared on the first and second dither tables of the dither processing unit 56.

Next, the number of specific image patterns existing in the area, for example, the number of image patterns that matches one of the detection patterns consisting of 4-by-3 pixels for the screen angle 45 degrees shown in FIGS. 6A through 6C, and one of the detection patterns consisting of 4-by-3 pixels for the screen angle 75 degrees shown in FIGS. 6D through 6F, is counted (step S25). The number thus counted is used to determine if the screen angle of the document image matches with that of the dither pattern prepared in the dither processing unit 56. If the number of lines of the document is very different from the number of lines of the dither pattern, no major moiré effect occurs. The detection pattern prepared has a number of lines that is close to the number of lines of the dither pattern.

Now, it is described in detail how the counting process of the step S25 is conducted when the document image data after being converted into binary data is the dot matrix image such as shown in FIG. 5A, and the inverse L-shaped detection pattern for the screen angle 45 degrees shown in FIG. 6A and the X-shaped detection pattern for the screen angle 75 degrees shown in FIG. 6D are used.

The detection pattern for the screen angle 45 degrees is overlaid at the top left side of the document image of FIG. 5A. Next, a judgment is made as to whether the image pattern, or the black and white pattern consisting of the 4-by-3 pixels of the document image matches with the detection pattern. If they match, the count is incremented by one. If they do not match, the count value does not change. Next, the position of the detection pattern relative to the document image is moved by one pixel to the right or in the X direction, and a judgment is made whether the image pattern at that position matches with the detection pattern. If the patterns match, the count is incremented by one. If they do not match, the count value does not change. A judgment is made whether the image pattern matches with the detection pattern in the same manner as above each time when the detection pattern is moved in the X direction by one pixel at a time until the rightmost pixel of the image document is reached. When the position of the detection pattern reaches the rightmost position of the document image, the position of the detection pattern relative to the document image is moved downward or in the Y direction by one line, or one pixel and a judgment will be made whether the image pattern at that position matches with the detection pattern. A judgment is made whether the image pattern matches with the detection pattern each time when the detection pattern is moved by one pixel at a time until the leftmost pixel of the image document is reached. The total number of times that the image pattern matched with the detection pattern for the screen angle of 45 degrees is determined based on the number of counts when the matching judgment is completed for the bottom line of the document image.

Next, the detection pattern for the screen angle of 75 degrees is used to repeat the process similar to the one mentioned above. The total number of times that the image pattern matched with the detection pattern for the screen angle of 75 degrees is determined based on the number of counts when the matching judgment is completed for the bottom line of the document image. If another detection pattern is prepared for a different screen angle, the matching judgment is conducted for said detection pattern as well, and the total number of times that the image pattern matched with the detection pattern shall be determined.

When the counting process of the step S25 is completed as mentioned above, the detection pattern that generates the highest number of matching counts is selected, and the screen angle for said pattern is assumed as the document image screen angle (step S26). For example, if the number of matching counts is 100 between the document image and the detection pattern for 45 degrees and number of matching counts is 35 between the document image and the detection pattern for 75 degrees, it is determined that the screen angle of the document image is 45 degrees.

If the screen angle of the document image is different from either of the two screen angles used for the detection patterns, no major moiré effect will be generated when either of the screen angles used for the detection patterns is set as the screen angle of the dither pattern. In case of this embodiment, the screen angle used for the detection pattern which produced the smallest number of matches is automatically set as the screen angle of the dither pattern.

As described above, when the screen angle of the document image is detected at step S2, i.e., through the process of the steps S21 through S26, it is then judged whether it matches with the screen angle of a dither pattern prepared on the first dither table, for example, the screen angle of the dither pattern for cyan which is planed to be used at the time of printing (step S3). If the screen angle detected is determined to match with the screen angle of the dither pattern for cyan at step S3, there is a concern for causing the moiré effect. In such a case, a dither pattern prepared at the second dither table for a screen angle different from the detected screen angle is read out and set on a memory that exists at the dither processing unit 56 (step S4). If the detected screen angle does not match with the screen angle planed to be used at step S3, there needs to be any concern for the moiré effect. In this case, the flow proceeds to the step S6 without changing the dither pattern setting prepared on the first dither table.

The image correction unit 54 sets up a γ table that corresponds to the dither pattern of the second dither table (step S5). The resetting of the γ table is to correspond to subtle changes of the density reproduction characteristics caused by the change of the dither pattern. The printer engine 22 applies the preset dither pattern to the image data which has been corrected using the preset γ table and outputs the printed cyan image data (step S6).

The image correction unit 54 executes the steps S1 through S6 sequentially as to magenta and yellow. Namely, the dither patterns and the γ tables are set up concerning magenta and yellow, and magenta and yellow image data are printed one after the other. This completes color printing.

The reason these processes are done separately for each color is that the screen angle of the document image varies with CMY colors. Therefore, the screen angles for cyan, magenta, and yellow document images are detected based on the red, green and blue image data, respectively.

In the first embodiment, the screen angles of 45 degrees and 75 degrees are applied as the angles that tend to generate the moiré effect. In other words, the first embodiment shows the case of detecting whether the screen angle of the document image matches with the dither pattern having the screen angle of 45 degrees or the dither pattern having the screen angle of 75 degrees, both of which are prepared in the system. However, it is possible to detect screen angles different from these by increasing the types of detection patterns. In this case, it is necessary to increase the types of dither patterns prepared in the system corresponding to the increase in the types of detection patterns.

Moreover, the screen angle detection method as stated above is characterized that the detection pattern is moved incrementally by each pixel or each line. However, if the printing speed is more important than the detection accuracy, it is possible to move the detection pattern by each block unit consisting of a plurality of pixels and/or a plurality of lines, for example, to move the detection pattern by each 3 pixels in the X direction and each 4 lines in the Y direction in order to improve the detection speed.

Embodiment 2

Figure 7:
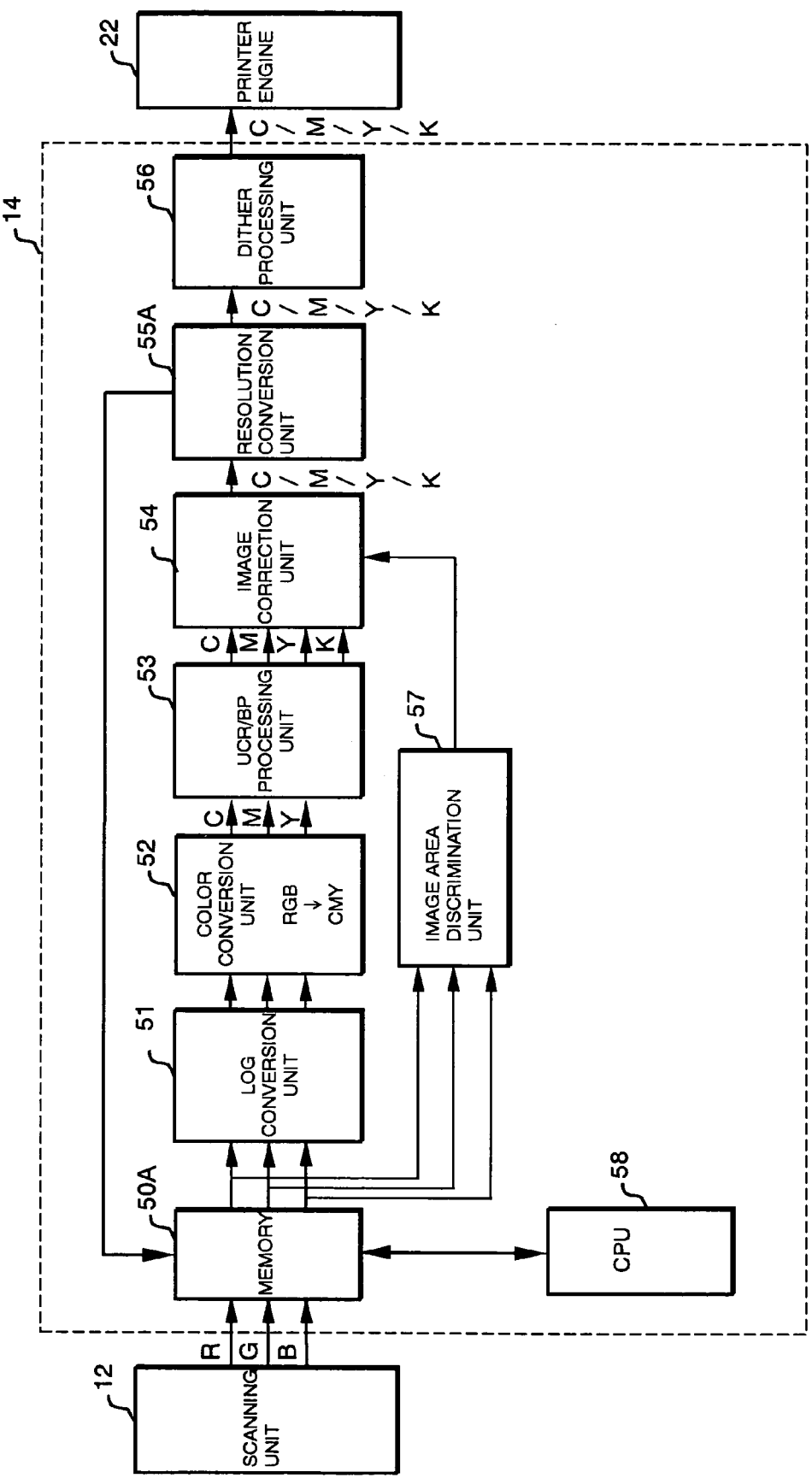
FIG. 7 is a block diagram of the image processing unit of the image forming apparatus of a second embodiment of the present invention.

The image processing unit of the image forming apparatus of the second embodiment, as shown in FIG. 7, has a structure similar to the image processing unit of the image forming apparatus according to the first embodiment shown in FIG. 2. However, the second embodiment is different from the first embodiment in that a resolution conversion unit 55A converts the reading resolution of the scanning unit 12, 300 dpi by 300 dpi, into the resolution, 600 dpi in the main scanning direction by 600 dpi in the secondary direction as the minimum units of the dither table and also that the conversion results of the resolution conversion unit 55A are stored into a memory 50A. The descriptions of the members equivalent to the members shown in FIG. 2 are omitted here in order to avoid the lengthiness.

Now, the process of detecting the screen angle of the document image to set up dither patterns that do not cause the moiré effect will be described in details referring to FIG. 8 and FIG. 9.

First, the document image is scanned by the scanning unit 12 to be converted into RGB image data consisting of 8 bits for each color, and the image data thus obtained is stored in the memory 50A of the image processing unit 14 (step S11).

The image processing unit 14 takes out the image data from the memory 50A, applies various image processes, and writes the results into the memory 50A (step S12). More specifically, the LOG conversion unit 51 converts the image data consisting of the reflection factor data taken out of the memory 50A into the RGB image data consisting of the density data. The color conversion unit 52 converts the RGB image data into the CMY image data. The UCR/BP processing unit 53 converts the CMY image data into the CMYK image data. The image correction unit 54 applies the MTF correction, the filtering process for smoothing, and the γ correction for matching the data with the output characteristics of the printer engine 22 to the CMYK image data. Lastly, the resolution conversion unit 55A converts the image data resolution to a higher value before it is stored in the memory 50A. The CMYK image data of a higher value to be stored in the memory 50A is an image data of a certain part of the image scanned by the scanning unit 12.

The dither processing unit 56 reads out the CMYK image data of a high resolution stored in the memory 50A by each color and determines the screen angle of the document image (step S13). More specifically, the dither processing unit 56 determines the screen angle of the document image for cyan, magenta, yellow and black based on the image data of the cyan image data, magenta image data, yellow image data and black image data, respectively.

Figure 9:
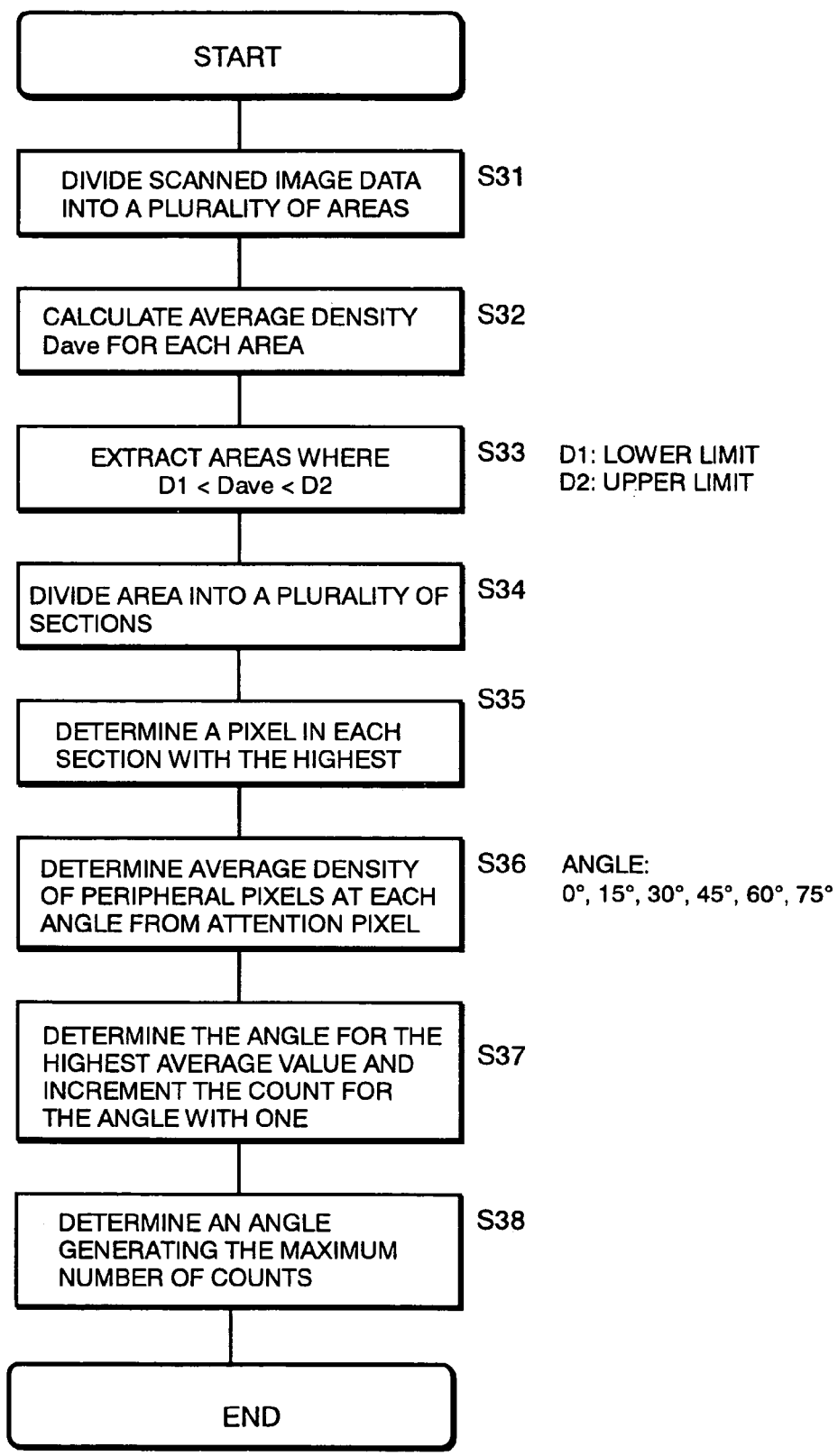
FIG. 9 is a flow chart of a subroutine for detecting a document image screen angle.

Now, the detection process of the screen angle executed by the dither process unit 56 at the step S13 is described in detail referring to FIG. 9.

First, the image data stored in the memory 50A is divided into a plurality of areas (step S31). An average density $D_{ave}$ is calculated for each area (step S32). Next, the areas whose average density $D_{ave}$ fall within the range between a predetermined lower limit D1 and a predetermined upper limit D2 are extracted (step S33). The reason for searching the areas whose densities fall within a certain range is that it is necessary to eliminate background areas with a low density and areas with a high density, which are inappropriate for detecting the screen angle of the document image. Next, the extracted areas are each divided into a plurality of sections (step S34).

The pixel with the highest density within each section is determined and is set up as an attention pixel (step S35). Average densities of the peripheral pixels located in the directions of 0, 15, 30, 45, 60 and 75 degrees relative to the direction perpendicular to the attention pixel are respectively calculated (step S36). Next, the angle that produces the maximum average density is determined and the count for the determined angle is incremented by one (step S37). The processes for the step S35 through S37 are applied to all sections of every area. Therefore, the count for each angle ends up showing the number of times it recorded the maximum value as the average density. Next, the system selects the angle corresponding to the maximum number of counts, and determines that the selected angle is the screen angle of the document image of the specific color (step S38).

When the detection of the screen angle of the document image for each color of cyan, magenta, yellow and black is completed by repeating the S13 process, i.e., the processes of S31–S38, a judgment is made whether the screen angle of the document image for each color matches with the screen angle of the dither pattern planed to be used (S14). If it is judged at step S14 that the screen angle of the document image for cyan matches with the screen angle of the dither pattern prepared in the first dither table, i.e., the screen angle of the dither pattern for cyan planed to be used in printing, there arises a concern for causing the moiré effect. If it happens so, a dither pattern prepared in the second dither table having a screen angle, which is different from that of the detected screen angle, is read and set into the memory existing in the dither processing unit 56 (step S15). On the other hand, if the screen angle is judged not to match with the screen angle of the dither pattern planed to be used for printing at step S14, there is no danger for any moiré effect to occur. In such a case, the flow proceeds to the step S17 without changing the setup of the dither pattern prepared on the first dither table.

The reason that the process is executed per each color as described above is that the screen angle of the document image is different for each color of cyan, magenta, yellow, and black. Consequently, the screen angles of the document images for cyan, magenta, yellow and black are checked based on the image data for red, green, blue and black, respectively.

Next, the image correction unit 54 sets up the γ table that corresponds to the dither pattern of the second dither table (step S16). The reset of the γ table is done to make it correspond with minute changes of the density reproduction characteristics accompanied with the change of the dither pattern. When the resetting of the γ table is finished at step S16, the printing start instruction will be issued to the printer engine 22. The printer ending 22 prints color images by applying dither patterns set up to image data corrected by means of the γ table set up for each color (step S17).

In the second embodiment, the screen angles of 0, 15, 30, 45, 60 and 75 degrees are applied as the angles that are apt to cause the moiré effect. However, it can be arranged to detect other screen angles.

It is obvious that this invention is not limited to the particular embodiments shown and described above but may be variously changed and modified by any person of ordinary skill in the art without departing from the technical concept of this invention.

For example, the present invention can also be applied to an image reading apparatus that combines the scanning unit 12 and the image processing unit 14 shown in FIG. 1 in a single box, or a printer controller that combines the image processing unit 14 and a controller 24 shown in FIG. 1 in a single box.

Furthermore, the present invention can be applied to an image forming system that includes interconnected three components, the scanning module 10, the printing module 20 and the computer 30 for controlling the scanning module 10 and the printing module 20 shown in FIG. 1, i.e., an image forming system that includes the image reading apparatus, the printer and the printer controller.

Figure 8:
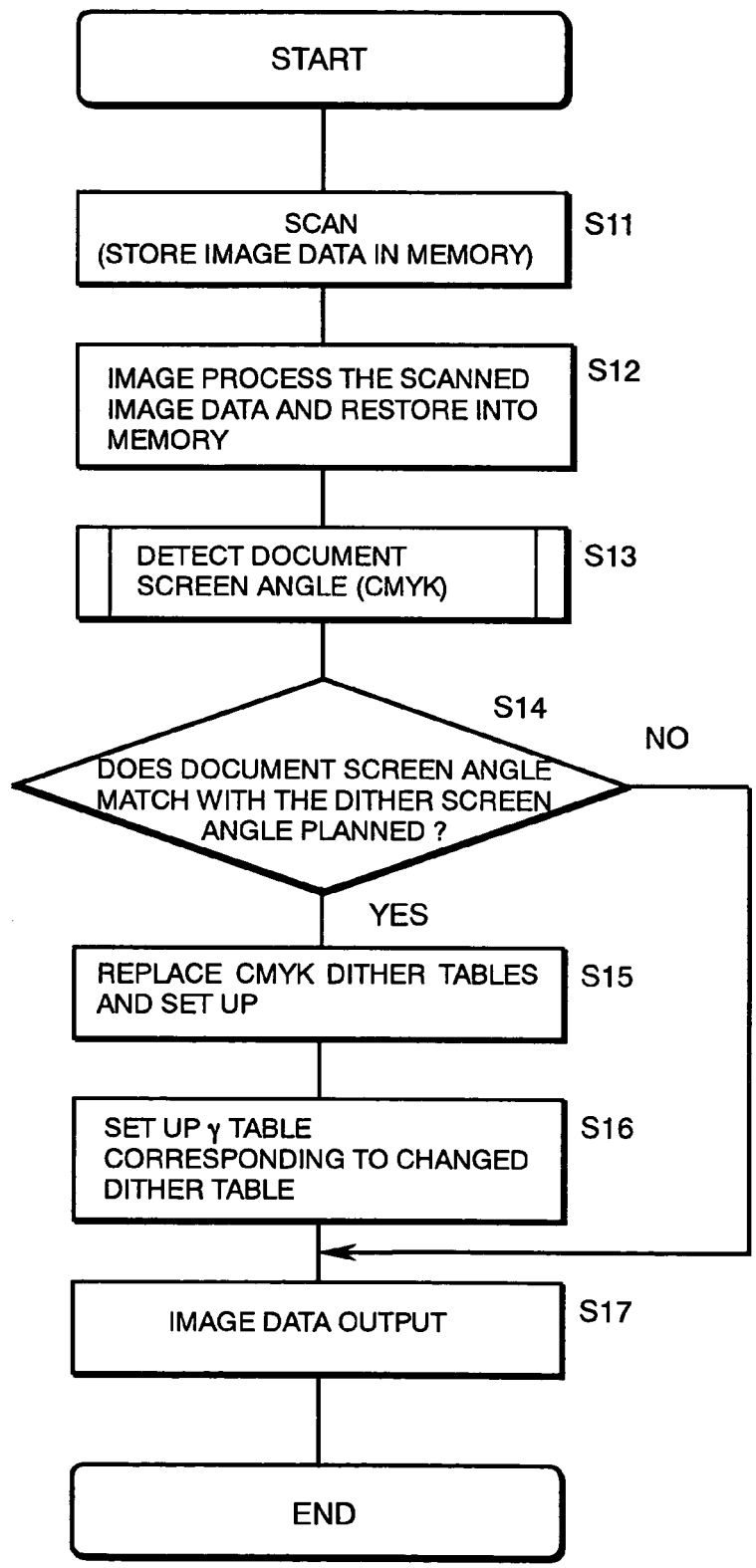
FIG. 8 is a flow chart for detecting a document image screen angle, setting up a dither pattern, and outputting an image.

A series of the procedures shown in FIG. 3 and FIG. 4 or the procedures that is shown in FIG. 8 and FIG. 9 can be used as a program as well. Namely, the technological idea of the present invention can be applied to an image forming apparatus, image reading apparatus, printer controller or a computer constituting a portion of an image forming system via a record medium that contains programs and can be read by a computer. The program contains steps of reading a document, detecting the screen angle of the read document image, setting up the dither pattern corresponding to the detected screen angle, and executing printing that reproduces quasi-halftone using the dither pattern thus set up.

What is claimed is:

1. An image forming apparatus comprising:
a receiving unit receiving image data;
a detecting unit detecting a screen angle of an image pattern described on a document based on the image data;
a setup unit selecting from a plurality of dither patterns a dither pattern with a screen angle different from the detected screen angle and setting up the dither pattern; and
a printing unit reproducing a quasi-halftone using the dither pattern set up by said setup unit, wherein said detecting unit detects screen angles of image data for cyan, magenta and yellow colors, and said setup unit selects from a plurality of dither patterns a dither pattern with a screen angle different from the detected screen angle and sets up the dither pattern for each color.

2. An image forming apparatus according to claim 1, further comprising a reading unit reading a document to obtain the image data.

3. An image forming apparatus comprising:
a receiving unit receiving image data;
a detecting unit detecting a screen angle of an image pattern described on a document based on the image data;
a setup unit selecting from a plurality of dither patterns a dither pattern with a screen angle different from the detected screen angle and setting up the dither pattern; and
a printing unit reproducing a quasi-halftone using the dither pattern set up by said setup unit, wherein said detecting unit detects screen angles of image data for cyan, magenta and yellow colors, and said setup unit selects from a plurality of dither patterns a dither pattern with a screen angle different from the detected screen angle and sets up the dither pattern for each color, and
said detection unit further comprises a color conversion unit converting the image data into cyan, magenta, yellow and black image data, a resolution conversion unit converting the cyan, magenta, yellow and black image data into high resolution image data, and a storage unit storing the high resolution image data, wherein screen angles of image data for cyan, magenta and yellow color are detected based on the image data stored in said storage unit.

4. An image forming apparatus comprising:
a receiving unit receiving image data;
a detecting unit detecting a screen angle of an image pattern described on a document based on the image data;
a setup unit selecting from a plurality of dither patterns a dither pattern with a screen angle different from the detected screen angle and setting up the dither pattern; and
a printing unit reproducing a quasi-halftone using the dither pattern set up by said setup unit, wherein said detecting unit has a plurality of detection patterns to compare the image data with the detection patterns, counts the numbers of image patterns that match with the detection patterns, and determines an angle of a detection pattern that provides a maximum matching count as the screen angle of the image data.

5. An image forming apparatus comprising:
a receiving unit receiving image data;
a detecting unit detecting a screen angle of an image pattern described on a document based on the image data;
a setup unit selecting from a plurality of dither patterns a dither pattern with a screen angle different from the detected screen angle and setting up the dither pattern; and
a printing unit reproducing a quasi-halftone using the dither pattern set up by said setup unit, wherein said detecting unit extracts an attention pixel from the image data, calculates average densities of peripheral pixels located in a plurality of directions relative to a direction perpendicular to the attention pixel, determines an angle that produces a maximum average density, and elects the determined angle as the screen angle of the image data.

6. An image reading apparatus comprising:
a reading unit reading an image data of a document;
a detection unit detecting a screen angle of an image pattern described on a document based on the image data; and
a setup unit selecting from a plurality of dither patterns a dither pattern with a screen angle different from the detected screen angle and setting up the dither pattern,
wherein said detecting unit detects screen angles of document images for cyan, magenta and yellow colors, and said setup unit selects from a plurality of dither patterns a dither pattern with a screen angle different from the detected screen angle and sets up the dither pattern for each color.

7. An image reading apparatus according to claim 6, further comprises a data generating unit generating a print data in order to reproduce a quasi-halftone using the dither pattern set up by said setup unit.

8. An image reading apparatus according to claim 6, in which said detection unit further comprises a color conversion unit converting the image data into cyan, magenta, yellow and black image data, a resolution conversion unit converting the cyan, magenta, yellow and black image data into high resolution image data, and a storage unit storing the high resolution image data, wherein screen angles of document images for cyan, magenta and yellow color are detected based on the image data stored in said storage unit.

9. An image reading apparatus comprising:
a reading unit reading an image data of a document;
a detection unit detecting a screen angle of an image pattern described on a document based on the image data; and
a setup unit selecting from a plurality of dither patterns a dither pattern with a screen angle different from the detected screen angle and setting up the dither pattern,
wherein said detecting unit has a plurality of detection patterns to compare the image data with the detection patterns, counts the numbers of image patterns that match with the detection patterns, and determine an angle of a detection pattern that provides a maximum matching count as the screen angle of the document image.

10. An image reading apparatus comprising:
a reading unit reading an image data of a document;
a detection unit detecting a screen angle of an image pattern described on a document based on the image data; and
a setup unit selecting from a plurality of dither patterns a dither pattern with a screen angle different from the detected screen angle and setting up the dither pattern,
wherein said detecting unit extracts an attention pixel from the image data, calculates average densities of peripheral pixels located in a plurality of directions relative to a direction perpendicular to the attention pixel, determines an angle that produces a maximum average density, and elects the determined angle as the screen angle of the document image.

11. A printer controller comprising:
a detection unit detecting a screen angle of an image pattern described on a document based on the image data;
a setup unit selecting from a plurality of dither patterns a dither pattern with a screen angle different from the detected screen angle and setting the dither pattern; and
a data generating unit generating a print data in order to reproduce a quasi-halftone using the dither pattern set up by said setup unit, wherein said detecting unit detects screen angles of image data for cyan, magenta and yellow colors, and said setup unit selects from a plurality of dither patterns a dither pattern with a screen angle different from the detected screen angle and sets up the dither pattern for each color.

12. A printer controller comprising:
a detection unit detecting a screen angle of an image pattern described on a document based on the image data;
a setup unit selecting from a plurality of dither patterns a dither pattern with a screen angle different from the detected screen angle and setting the dither pattern; and
a data generating unit generating a print data in order to reproduce a quasi-halftone using the dither pattern set up by said setup unit, wherein
said detecting unit detects screen angles of image data for cyan, magenta and yellow colors, and said setup unit selects from a plurality of dither patterns a dither pattern with a screen angle different from the detected screen angle and sets up the dither pattern for each color, and
said detection unit further comprises a color conversion unit converting the image data into cyan, magenta, yellow and black image data, a resolution conversion unit converting the cyan, magenta, yellow and black image data into high resolution image data, and a storage unit storing the high resolution image data, wherein screen angles of the image data for cyan, magenta and yellow color are detected based on the image data stored in said storage unit.

13. A printer controller comprising:
a detection unit detecting a screen angle of an image pattern described on a document based on the image data;
a setup unit selecting from a plurality of dither patterns a dither pattern with a screen angle different from the detected screen angle and setting the dither pattern; and
a data generating unit generating a print data in order to reproduce a quasi-halftone using the dither pattern set up by said setup unit, wherein
said detecting unit detects screen angles of image data for cyan, magenta and yellow colors, and said setup unit selects from a plurality of dither patterns a dither pattern with a screen angle different from the detected screen angle and sets up the dither pattern for each color, and
said detecting unit has a plurality of detection patterns to compare the image data with the detection patterns, counts the numbers of image patterns that match with the detection patterns, and determines an angle of a detection pattern that provides a maximum matching count as the screen angle of the image data.

14. A printer controller comprising:
a detection unit detecting a screen angle of an image pattern described on a document based on the image data;
a setup unit selecting from a plurality of dither patterns a dither pattern with a screen angle different from the detected screen angle and setting the dither pattern; and
a data generating unit generating a print data in order to reproduce a quasi-halftone using the dither pattern set up by said setup unit, wherein
said detecting unit detects screen angles of image data for cyan, magenta and yellow colors, and said setup unit selects from a plurality of dither patterns a dither pattern with a screen angle different from the detected screen angle and sets up the dither pattern for each color, and said detecting unit extracts an attention pixel from the image data, calculates average densities of peripheral pixels located in a plurality of directions relative to a direction perpendicular to the attention pixel, determines an angle that produces a maximum average density, and elects the determined angle as the screen angle of the image data.

15. An image forming system comprising:

a receiving apparatus for receiving image data;

a printer controller for detecting a screen angle of an image pattern described on a document based on the image data, selecting from a plurality of dither patterns a dither pattern with a screen angle different from the detected screen angle and setting the dither pattern; and a printer for reproducing a quasi-halftone using the dither pattern set up by said printer controller, wherein said printer controller detects screen angles of image data for cyan, magenta and yellow colors, and selects from a plurality of dither patterns a dither pattern with a screen angle different from the detected screen angle and sets up the dither pattern for each color.

16. An image forming system according to claim 15, further comprising a reading apparatus for reading a document to obtain the image data.

17. An image forming system according to claim 15, in which said printer controller further comprises a color conversion unit converting the image data into cyan, magenta, yellow and black image data, a resolution conversion unit converting the cyan, magenta, yellow and black image data into high resolution image data, and a storage unit storing the high resolution image data, wherein screen angles of the image data for cyan, magenta and yellow color are detected based on the image data stored in said storage unit.

18. An image forming system comprising:

a receiving apparatus for receiving image data;

a printer controller for detecting a screen angle of an image pattern described on a document based on the image data, selecting from a plurality of dither patterns a dither pattern with a screen angle different from the detected screen angle and setting the dither pattern; and a printer for reproducing a quasi-halftone using the dither pattern set up by said printer controller, wherein said printer controller has a plurality of detection patterns to compare the image data with the detection patterns, counts the numbers of image patterns that match with the detection patterns, and determines an angle of a detection pattern that provides a maximum matching count as the screen angle of the image data.

19. An image forming system comprising:

a receiving apparatus for receiving image data;

a printer controller for detecting a screen angle of an image pattern described on a document based on the image data, selecting from a plurality of dither patterns a dither pattern with a screen angle different from the detected screen angle and setting the dither pattern; and a printer for reproducing a quasi-halftone using the dither pattern set up by said printer controller, wherein said printer controller extracts an attention pixel from the image data, calculates average densities of peripheral pixels located in a plurality of directions relative to a direction perpendicular to the attention pixel, determines an angle that produces a maximum average density, and elects the determined angle as the screen angle of the image data.

20. A computer-readable medium for storing a program readable and executable by a computer, said program performing the steps of:

(A) receiving image data;

(B) detecting a screen angle of an image pattern described on a document based on the image data;

(C) selecting from a plurality of dither patterns a dither pattern with a screen angle different from the detected screen angle and setting the dither pattern; and (D) reproducing a quasi-halftone using the setup dither pattern, wherein said step (B) of said program performs the steps of (1) converting the image data into cyan magenta, yellow and black image data, (2) converting said cyan, magenta, yellow and black image data into high resolution image data, (3) storing the high resolution image data, and (4) detecting screen angles of image data for cyan, magenta, and yellow colors based on the stored image data.

21. A computer-readable medium according to claim 20, in which said program further performs the steps of (E) reading a document to obtain the image data, and (F) transmitting the read image data.

22. A-computer-readable medium according to claim 20, in which said step (B) of said program performs the steps of (1) comparing the image data with a plurality of detection patterns, (2) counting the number of image patterns that match with the detection patterns, (3) selecting a detection pattern that provides a maximum matching counts, and (4) determining an angle of the selected detection pattern as the screen angle of the image data.

23. A computer-readable medium according to claim 20, in which said step (B) of said program performs the steps of (1) extracting an attention pixel from the image data, (2) calculating average densities of peripheral pixels located in a plurality of directions relative to a direction perpendicular to the attention pixel, (3) determining an angle that produces a maximum average density, and (4) electing the determined angle as screen angle of the image data.

24. An image processing apparatus comprising:

a receiving unit receiving image data;

a detecting unit detecting a screen angle of an image pattern described on a document based on the image data; and a setup unit selecting, from a plurality of dither patterns, a dither pattern with a screen angle different from the detected screen angle and setting up the dither pattern, wherein said detecting unit detects screen angles of image data for cyan, magenta and yellow colors, and said setup unit selects from a plurality of dither patterns a dither pattern with a screen angle different from the detected screen angle and sets up the dither pattern for each color.

* * * * *